(12) United States Patent
Kehl et al.

(10) Patent No.: US 7,899,815 B2
(45) Date of Patent: Mar. 1, 2011

(54) APPARATUS AND METHODS FOR PROVIDING SEARCH BENCHMARKS

(75) Inventors: Thomas A. Kehl, Palo Alto, CA (US);
Jyri M. W. Kidwell, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 357 days.

(21) Appl. No.: 11/743,623

(22) Filed: May 2, 2007

(65) Prior Publication Data

US 2008/0275882 A1 Nov. 6, 2008

(51) Int. Cl.
*G06F 7/00* (2006.01)
(52) U.S. Cl. .................................... 707/727
(58) Field of Classification Search ............... None
See application file for complete search history.

(56) References Cited

U.S. PATENT DOCUMENTS

| | | | | |
|---|---|---|---|---|
| 6,195,679 | B1* | 2/2001 | Bauersfeld et al. | 709/203 |
| 7,565,425 | B2* | 7/2009 | Van Vleet et al. | 709/224 |
| 2003/0055816 | A1* | 3/2003 | Paine et al. | 707/3 |
| 2005/0004835 | A1* | 1/2005 | Roslansky et al. | 705/14 |
| 2005/0027822 | A1* | 2/2005 | Plaza | 709/218 |
| 2005/0132267 | A1* | 6/2005 | Aviv | 715/500.1 |
| 2006/0064411 | A1* | 3/2006 | Gross et al. | 707/3 |
| 2008/0016101 | A1* | 1/2008 | Ginsburg et al. | 707/102 |

OTHER PUBLICATIONS

"A web prodiction model based on clickstream tree resentation of user behavior", ule Gündüz et al., pp. 535-540, 2003 (http://delivery.acm.org/10.1145/960000/956815/p535-gunduz.pdf?key1=956815&key2=3456758821&coll=GUIDE&dl=GUIDE&CFID=108024028&CFTOKEN=24666843).*
"Evaluation of webpage usage mining approaches for user next request prediction", Mathias Géry et al., pp. 74-81, 2003, (http://delivery.acm.org/10.1145/960000/956716/p74-gery.pdf?key1=956716&key2=0866758821&coll=GUIDE&dl=GUIDE&CFID=108024219&CFTOKEN=34995159).*
"Web path recommendation based on page ranking and Markov models", Magdalini Eirinaki et al., pp. 2-9, 2005, http://delivery.acm.org/10.1145/1100000/1097050/p2-eirinaki.pdf?key1=1097050&key2=2576758821&coll=GUIDE&dl=GUIDE&CFID=108024304&CFTOKEN=85226131.*
Joachims, T., "Optimizing Search Engines using Clickthrough Data", Cornell Univeristy, Department of Computer Science, Ithaca, New York, 2002.
Chakrabarti et al. "Contextual Advertising by Combining Relevance with Click Feedback", WWW 2008/Refereed Track: Search—Ranking & Retrieval Enhancement, Apr. 21-25, 2008, Beijing, China, pp. 417-426.

* cited by examiner

*Primary Examiner* — Neveen Abel-Jalil
*Assistant Examiner* — Kellye D Buckingham
(74) *Attorney, Agent, or Firm* — Weaver Austin Villeneuve & Sampson LLP

(57) ABSTRACT

Disclosed are apparatus and methods for quantifying how much searchers select other search results, instead of a particular search result. In example embodiments, the number of times that other search results are selected before a particular search result is selected (referred to as pre-pogosticking) is tracked, and the number of times that other search results are selected after a particular search result is selected (referred to as post-pogosticking) is also tracked. This pogosticking information may be used to improve search result ranking as produced by a search algorithm or to provide metrics to potential or current buyers of particular search terms.

18 Claims, 5 Drawing Sheets

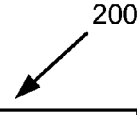

| Session ID | Term | Search Results | Selected | Selection Time | Sponsor | Owner |
|---|---|---|---|---|---|---|
| ID_1 | loan | x | yes | 3:03:02 pm | yes | Owner_1 |
| ID_1 | loan | y | yes | 3:03:03 pm | no | Owner_2 |
| ID_1 | loan | z | yes | 3:03:01 pm | no | Owner_3 |
| ID_2 | Company_abc | 1 | yes | 3:15:05 pm | yes | Owner_1 |
| ID_2 | Company_abc | 2 | yes | 3:15:04 pm | no | Owner_4 |
| ID_2 | Company_abc | 3 | no | - | no | Owner_5 |
| ID_3 | loan | x | yes | 3:35:01 pm | yes | Owner_6 |
| ID_3 | loan | y | yes | 3:35:02 pm | no | Owner_1 |
| ID_3 | loan | z | yes | 3:35:03 pm | no | Owner_2 |

Figure 2A

PogoSticking Rate
for the term "loan" from Jan. 1st - 7th

| Search Result | Display Section | Ave. Rank | Ave. Pre-Pogostick Rate | Ave. Post-Pogostick Rate |
|---|---|---|---|---|
| x | Sponsor | 1.40 | 3.17 | 3.17 |
| y | Algo | 1.80 | 3.38 | 3.38 |
| z | Algo | 2.50 | 2.49 | 2.49 |
| 1 | Sponsor | 3.90 | 4.40 | 4.40 |
| 2 | Algo | 1.00 | 1.39 | 1.39 |
| 3 | Algo | 2.10 | 2.07 | 2.07 |

Figure 2B

APPARATUS AND METHODS FOR PROVIDING SEARCH BENCHMARKS

BACKGROUND OF THE INVENTION

The present invention relates to the field of network search tools. More specifically, it also relates to compiling and analyzing data related to keyword searches and the ranked search results.

A search algorithm typically operates to locate the web pages that contain one or more of the keywords, that are entered by a user, and then ranks such located pages based on various factors, such as the frequency and number of entered keywords that are within each page and the position of the entered keywords within each page. For instance, a first page that has a keyword located in the title or near the top of the page may be ranked higher than a second page that has a keyword in a footer or near the bottom of such second page. The located pages are then presented, based on their relative rankings, to the searcher. Typically, links to the located pages are presented to the user in a list format, from the highest to lowest rank.

Although a search algorithm may present pages in a ranked order that represents the most relevant search results for certain users, other users may find the rankings to be inadequate or irrelevant to their needs. For instance, although a user may initially select a highly ranked search result as being relevant for his/her needs, he/she may then "pogostick" to one or more lower ranked search results until a relevant search result is found.

Improved techniques for characterizing the relevance of the ranking of search results rankings would be beneficial.

SUMMARY OF THE INVENTION

Accordingly, apparatus and methods for quantifying how much searchers select other search results, instead of a particular search result, are disclosed. In example embodiments, the number of times that other search results are selected before a particular search result is selected (referred to as pre-pogosticking) is tracked, and the number of times that other search results are selected after a particular search result is selected (referred to as post-pogosticking) is also tracked. This pogosticking information may then be used to improve search result ranking as produced by a search algorithm or to provide metrics to potential or current buyers of particular search terms.

In one embodiment, a method of quantifying pogosticking with respect to a network search tool is disclosed. The one or more selections by one or more users of a particular search result and one or more other search results are analyzed. The particular search result and the one or more other search results are presented after a particular search request is initiated. For the particular search result, the number of one or more other search results, that are selected by one or more users before or after such one or more users have selected the particular search result, is quantified and stored.

In a specific implementation, the number of one or more other search results is quantified by (i) quantifying an average of the number of one or more other search results that are selected by each of one or more users before such one or more users have selected the particular search result, and/or (ii) quantifying an average of the number of one or more other search results that are selected by each of one or more users after such one or more users have selected the particular search result.

In a further aspect, the first and second averages are associated with an identify of the particular search result and one or more of the more of the following associated information: an identify an indication of a type of the particular search result, an average ranking of the particular search result, or the search term used in the particular search request. In yet a further aspect, the first and second averages for the particular search result, along with the associated information, are presented to a user that has requested such first and second averages and associated information. In a further application of the invention, a search algorithm is adjusted based on the stored number of one or more other search results that are selected by one or more users before or after such one or more users have selected the particular search result.

In another embodiment, the invention pertains to an apparatus having at least a processor and a memory. The processor and/or memory are configured to perform one or more of the above-described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures, which illustrate by way of example the principles of the invention.

BRIEF DESCRIPTION OF THE DRAWINGS

FIG. 2A illustrates an example search database in accordance with one implementation of the present invention.

FIG. 2B illustrates an example pogosticking database in accordance with one implementation of the present invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general, embodiments of the present invention provide mechanisms for tracking the amount of "pogosticking" that occurs during user searches. Pogosticking refers to the act of jumping from and then back to a particular search result that is presented to a user. In a first example, a user performs pre-pogosticking by jumping to one or more other search results prior to clicking on a particular search result of interest. In another example, a user performs post-pogosticking by clicking on a number of other search results after the particular search result of interest has been clicked. In other words, the user jumps or "pogosticks" between selected search results before or after selection of the particular search result of interest.

Figure 1:
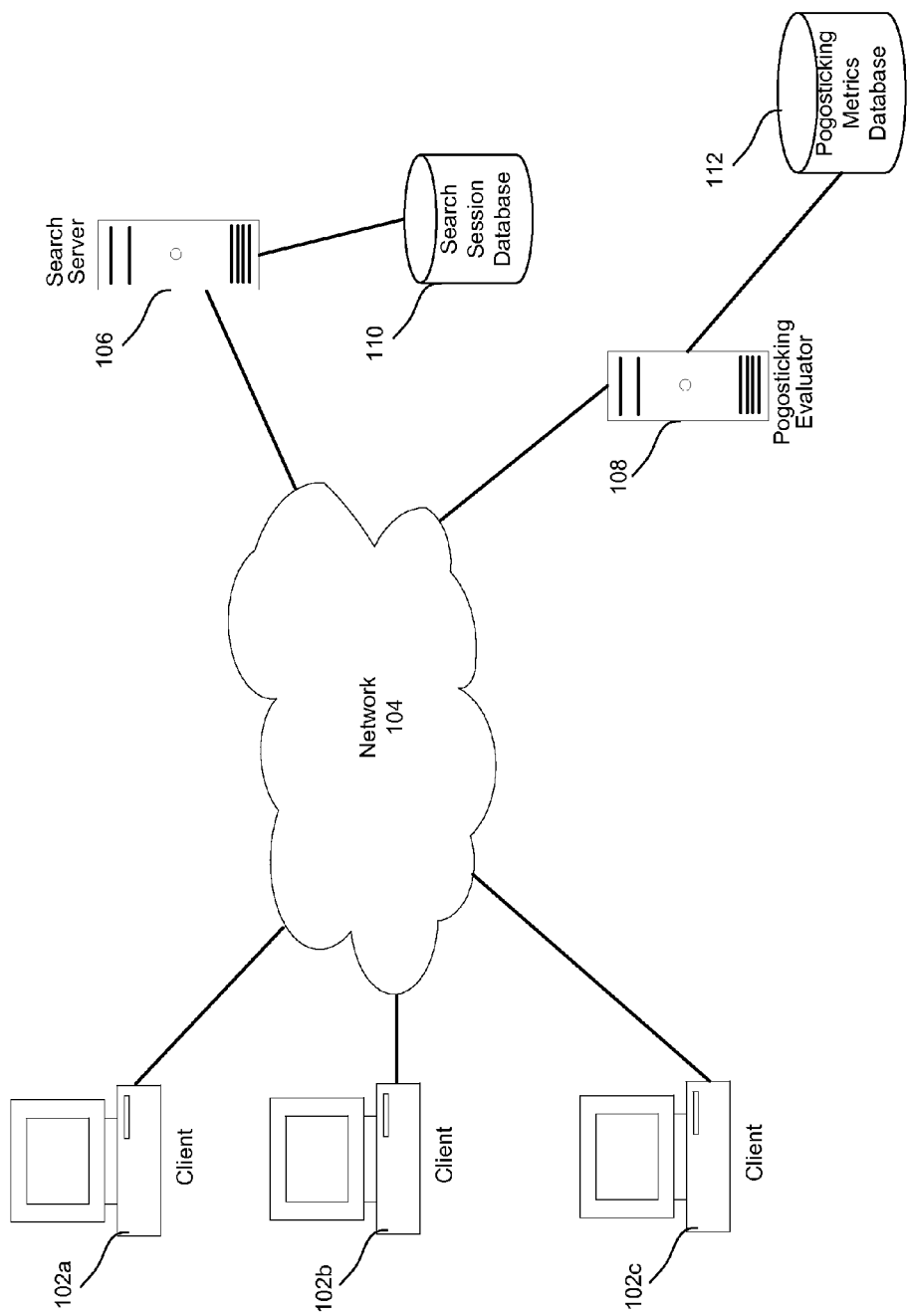
FIG. 1 illustrates an example network search environment in which the present invention may be implemented in accordance with one embodiment of the present invention.

FIG. 1 illustrates an example network search environment in which the present invention may be implemented in accordance with one embodiment of the present invention. As shown, a plurality of clients 102 may access a search application, for example, on search server 106 via network 104. The network may take any suitable form, such as a wide area network or Internet and/or one or more local area networks (LAN's). The network 104 may include any suitable number and type of devices, e.g., routers and switches, for forwarding search requests from each client to the search application and search results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The search application generally allows a user (human or automated entity) to search for information accessible via network 104 related to one or more search terms. The search terms may be entered by a user in any manner. For example, the search application may present a web page having any input feature to the client (e.g., on the client's device) so the client can enter one or more search term(s). In a specific implementation, the search application presents an input box into which a user may type any number of search terms. Embodiments of the present invention may be employed with respect to any search application, and example search applications include Yahoo! Search, Google, AltaVista, Ask Jeeves, etc. The search application may be implemented on any number of servers although only a single search server 106 is illustrated for clarity.

The search server 106 (or servers) may have access to one or more search database(s) 110 into which search information may be retained. Each time a user performs a search on one or more search terms, information regarding such search may be retained in the search database(s) 110. For instance, the user's search request may contain any number of parameters, such as user or browser identity, search session identity, and the search terms, and these search parameters may be retained in the search database(s) 110. When results are presented to the user based on the entered search terms, parameters from such search results may also be retained. For example, the specific search results, such as the web sites, the order in which the search results are presented, whether each search result is a sponsored or algorithmic search result, the owner of each search result, and whether each search result is selected by the user (if any) may also be retained in the search database(s) 110. Additional information related to the search, such as the current time of each search result selection (or an indication as to the order of search result selection), may also be retained along with the search request parameters.

The search database(s) may take any suitable form for retaining useful search information for incremental click analysis, which is described below. FIG. 2A illustrates an example search database 200 in accordance with one implementation of the present invention. In this example, each entry relates various parameters of a particular search session for a particular search term and a particular search result. An abbreviated list of search results is illustrated for each search session in FIG. 2A for simplification purposes. Of course, each search session would more typically include a higher number of search results than shown in FIG. 2A. Although not shown, each entry may also include a user identifier (if the user has logged in), a browser identifier, device identifier (e.g., IP or MAC address), or any other suitable identifier for uniquely identifying the particular user.

In the illustrated example, each entry includes a "session identifier (ID)" field, a "search term" field, "search result" field, a "selected" field that specifies whether such search result was selected by the user, a "selection time" field that specifies when the corresponding search result was selected or clicked on by a user (if the search result was not clicked, this field may contain a null value), a "sponsor" field that specifies whether such search result is a sponsored search result (e.g., that is purchased for the particular search term), and an "owner" field for the associated search result. Various other formats may also be utilized. The retained information may include other types of data, such as the rank of the search result among all of the search results, a category for the search term, etc.

The "session ID" field may take the form of a unique value, such as a randomly assigned number, for uniquely identifying a particular session. For instance, when a search is initiated, a search identity may be assigned to the search results and the associated retained information for each search result. The session may be closed so that information regarding such session is no longer retained based on any suitable triggers, such as the searcher closing the search results page, the searcher initiating a new search, the session timing out, etc.

The "search term" field corresponds to one or more words that were input to the search application during the particular search session. A specific search session may include more than one search term, which may be included in the same or a different entry of the search database. Each search result was presented to the searcher in response to initiation of the particular search on the specified search term.

The "selected" field specifies whether the particular search result has been selected or clicked on by a user. In the illustrated example, the search results x, y, and z were each selected for the search session ID_1 for the search term "loan". For the search session ID_2 for the search term "Company_abc", the search results 1 and 2 were selected, while the search result 3 was not selected for such search session and search term. Similarly, the search result x, y, and z were all selected for the session ID_3 for the search term "loan".

The "selection time" field associated with each search result of each search session may correspond to any suitable time format for specifying a selection time for the particular search result, and may specify any combination of day, month, year, time, and time zone. In the search session ID_1, the search results were selected in the following order: z, x, and y. In the search session ID_2, the search result 2 was selected and then the search result 1 was selected, while the search results 3 was never selected. In the search session ID_3, the search results were selected in the following order: x, y, and z.

The "sponsor" field may be included in each search entry to specify whether the search result has been sponsored (e.g. a bid accepted) so as to appear in a purchased or sponsored search results list. The "owner" field may specify an owner of the search result. A search result may include one or more URL (universal remote locator) sites that belong to a same owner. An owner may be generally defined as an entity that controls or manages the corresponding search result. For instance, the owner can be a company and the search result can specify the company's main website.

In certain embodiments of the present invention, a pogosticking evaluator 108 (FIG. 1) operates to quantify the amount of pogosticking that occurs for particular search results. The pogosticking evaluator can have access to the search database(s) 110, as well as one or more pogosticking metrics database(s) 112. Alternatively, the pogosticking evaluator 108 may be integrated with the search server 106 and/or the pogosticking metrics database(s) 112 may be merged with search database(s) 110. The pogosticking metrics database(s) may generally include any data for quantifying pogosticking metrics for a plurality of search results.

FIG. 2B illustrates an example pogosticking database 250 in accordance with one implementation of the present invention. As shown, each entry associates a particular search result with a number of parameters including a "display section" field, an "average rank" field, an "average pre-pogosticking rate" field, and an "average post-pogosticking rate" field. The illustrated entries are also associated with a particular search term, i.e., "loan", for a particular period of time, e.g., January $1^{st}$ through $7^{th}$.

Figure 3:
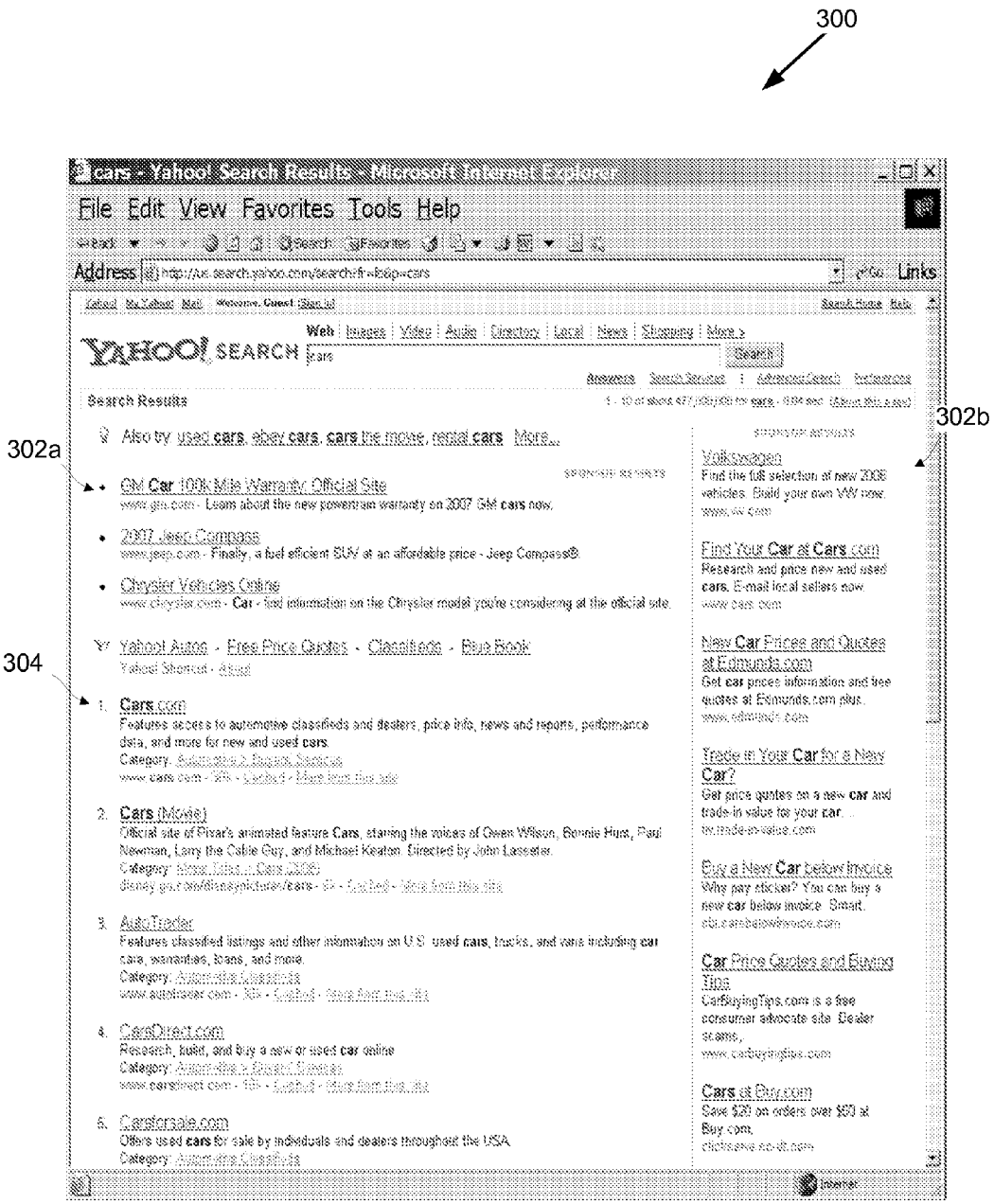
FIG. 3 is a screen shot of an example search results page for searching on the "cars" search term.

FIG. 3 is a screen shot 300 of an example search results page for searching on the "cars" search term, and this screen shot will be used to illustrate various pogosticking terms as used with respect to the pogosticking metrics database 250. As shown in FIG. 3, the search results include two sponsored search lists 302a and 302b and an algorithmic search list 304. That is, each search result may be appear in a sponsored section or an algorithmic section. In general, the sponsored section contains search results from entities that have purchased the particular search term, e.g., during a search term bidding session. The algorithmic section presents search results based on a search algorithm. In each section, the search results are also presented in a ranked fashion. For the sponsored section, the ranking may depend on a search result's relevance with respect to the particular search term, as well as the amount of the bid for such search term. For the algorithmic section, the ranking may be based on a complex set of factors that relate to a search result's relevance with respect to the particular search term.

In the example of FIG. 3, three search results are presented in sponsor section 302a with the search result for the "GM" web site is listed in position (1). Seven search results are presented in the second sponsor section 302b with the search results for the "Volkswagen" web site being in the top ranked position. Five search results are listed in algorithmic section 304 with the search result "cars.com" holding the top ranked position.

Referring back to the pogosticking metrics database of FIG. 2B, the "display section" field indicates in which section of the search results pages the corresponding search result is presented. For example, the search result "x" is presented in the sponsor section, while the search result "y" is presented in the algorithmic (e.g., "algo") section. It is also possible that a single search result may be presented in both a sponsor and algo section. In this case, the search result may be listed twice for the sponsor and algo section.

The "average rank" for a search result simply indicates an average ranking that has been determined, e.g., by the search algorithm or by a sponsor bidding type algorithm, for the particular search result for a plurality of search sessions. For example, the search result "z" has been ranked consistently in position (1) in the algorithmic section and has an average rank of 1.00 for the search term "loan". Likewise, the search result "z" has been presented in position (2) for half of the searches on the term "loan" and in position (3) for the other half of the searches. Accordingly, the search result "z" has an average rank of 2.50.

The "average pre-pogosticking rate" indicates how many search results, on average, have been selected or clicked on prior to selection of the particular search result. For instance in FIG. 3, a searcher may select the highest ranked search result "cars.com" first, and then "back" out of the search result and select the next highest ranked search result "cars (Movie)". If the searcher then ends the search session, the pre-pogosticking rate for the particular search session would then be 0.00 for the search results "cars.com" since no other search results were selected prior to the user selecting this particular search result. In contrast, the pre-pogosticking rate for this particular search session would be 1.00 for the search result "cars (Movie)." Both of these pre-pogosticking rates for the particular search session could then be averaged with pre-pogosticking rates from previous search sessions to determine an average pre-pogosticking rate.

The "average post-pogosticking rate" indicates how many search results, on average, have been selected or clicked on after the selection of the particular search result. The post-pogosticking rate for the previous search session example is 1.00 for the search result "cars.com" since one search result, i.e., "cars (movie)", was selected after selection of the search result of interest, i.e., "cars.com". The post-pogosticking rate for this same search session is 0.00 for the search result "cars (movie)" since zero search results are selected after selection of this search result of interest, i.e., "cars (movie)."

Figure 4:
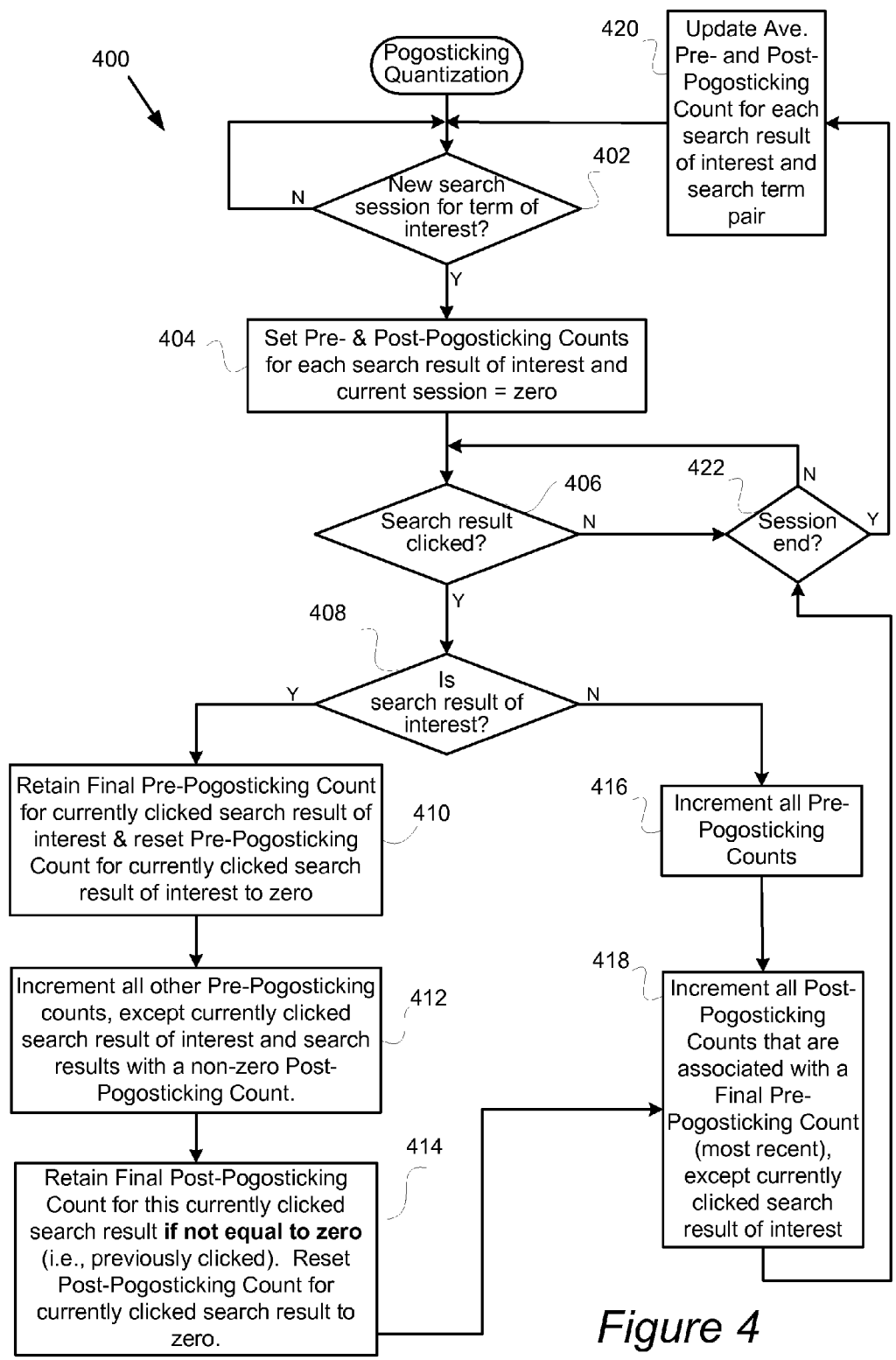
FIG. 4 is a flow chart illustrating a procedure for quantifying pogosticking metrics in accordance with one embodiment of the present invention.

FIG. 4 is a flow chart illustrating a procedure 400 for quantifying pogosticking metrics in accordance with one embodiment of the present invention. Initially, it may be determined whether a new search has been initiated for a particular search term of interest in operation 402. In one implementation, a number of search terms, as well as a number of search results, may be deemed to be of interest. By way of example, a user of the pogosticking evaluator 108 may select a set of search terms and search results for pogosticking analysis. The selected search terms and search results may be fed into the pogosticking quantification process in any suitable manner, such as an input field in a user interface for the pogosticking quantification process. The selected terms and search results are preferably handled by an administrator or owner of such pogosticking quantification application.

Pogosticking metrics may be determined as each searcher initiates a search session and selects particular sets of search results as shown in the illustrated example. Alternatively, pogosticking metrics may be determined based on post-search analysis of the search database(s). In the former example, the pogosticking evaluator engine receives (or obtains) search information each time a search is performed, and in the later example the pogosticking evaluator engine can access the search database after each of the search or periodically after any number of searches to determine pogosticking metrics.

Referring back to FIG. 4, if a search has not been initiated, the procedure 400 may continue to wait for a search initiation. When a search is initiated, a Pre-Pogosticking Count and a Post-Pogosticking Count for the current session and each search result of interest may be set to zero in operation 404. It may then be determined whether a search result has been clicked (e.g., selected by a user) in operation 406. If a search result has not been selected, it may be determined whether the current search session has ended in operation 422. If the current session has ended, the procedure repeats and awaits another search session initiation in operation 402 after performing a further pogosticking quantification, which is described further below, in operation 420. If the current session has not ended, it may then be determined again whether a search result has been clicked in operation 406.

When a search result is clicked, it may then be determined whether the clicked search result is of interest in operation 408. That is, it is determined whether the currently selected search result has been specified to have pogosticking metrics determined for it. If the currently clicked search result is not of interest, all Pre-Pogosticking Counts (for search results of interest) may then be incremented in operation 416. In the example of FIG. 3, the search result "AutoTrader" in position (3) of the algorithmic section may be deemed to be of interest, while search results in positions (1) and (2) are not of interest. Thus, if the search result "cars.com" in position (1) is initially selected, the Pre-Pogosticking Count for the search result of interest "AutoTrader" is incremented to a value of 1.00, as well as other Pogosticking Counts of other search results of interest. Next, all Post-Pogosticking Counts that are associated with a Final Pre-Pogosticking Count are incremented in operation 418. In the current example, a Final Pre-Pogosticking Count has not yet been retained for any of the search results of interest (which occurs later in this example) so this operation is not performed. The procedure then awaits selection of another search result in operation 406 unless the session has ended.

When the currently clicked search result is of interest, a Final Pre-Pogosticking Count may then be retained for the currently clicked search result of interest and the Pre-Pogosticking Count for such currently clicked search result may be reset to zero in operation 410. In the above example, if the search result of interest "AutoTrader" is selected after the initial selection of the search result in position (1), the Pre-Pogosticking Count of 1.00 that was previously incremented for this search result "AutoTrader" is retained as a Final Pre-Pogosticking Count. This Final Pre-Pogosticking Count of 1.00 indicates that 1.00 search result, e.g., search result "cars.com" in position (1), has been selected prior to selection of this search result of interest, "AutoTrader".

All other Pre-Pogosticking Counts, except the currently clicked search result of interest, are also incremented in operation 412. A Final Post-Pogosticking Count for the currently clicked search result may also be retained if the Post-Pogosticking Count for such search result is not equal to zero in operation 414. A non-zero Post-Pogosticking Count for the current search result is also reset to zero (if not already zero) in this operation 414. That is, if the currently clicked search result has previously been selected, it may have a positive Post-Pogosticking Count that is retained as a Final-Pogosticking Count for such search result and reset to zero since the search result has been selected again.

Pre- and Post-Pogosticking Counts continue to be incremented as new search results are selected until the session ends. For instance, if a second search result of interest, such as "CarsDirect.com" in position (4) of the algo section, is selected after the search result "AutoTrader", the Pre-Pogosticking Count for "CarsDirect.com" has been previously incremented to 2.00 in operation 416 for the initial selection of the search result in position (1) that was not of interest and in operation 412 after selection of the search result of interest "AutoTrader". Thus, this Pre-Pogosticking Count of 2.00 is retained as a Final Pre-Pogosticking Count for the search result of interest "CarsDirect.com" in operation 410. All other Pre-Pogosticking Counts are incremented in operation 412 with two exceptions. Pre-Pogosticking Counts of the currently clicked search result "CarsDirect.com" and search results with a non-zero Post-Pogosticking count, i.e., previously selected search results of interest such as the "AutoTrader" search result, are not incremented in operation 412.

Since this current search result "CarsDirect.com" has not been previously selected, it has a zero Post-Pogosticking Count and operation 414 is skipped. However, all Post-Pogosticking Counts that are associated with a Final Pre-Pogosticking Count are incremented, except for the ones that are associated with the currently clicked search result, in operation 418. In the current example, the search result "AutoTrader" had a previously retained Final Pre-Pogosticking Count of 1.0 since this search result of interest was selected previously so the Post-Pogosticking Count for search result "AutoTrader" is incremented to 1.00 to track the post pogosticking from "AutoTrader" to the current search result "CarsDirect.com".

When it is determined that the session has ended in operation 422, an Average Pre- and Post-Pogosticking Counts for each search result of interest and search term pair may then be updated in operation 420. That is, the Pogosticking metrics from a plurality of search sessions may be averaged together. Also, if a particular search result was selected multiple times during a single search session, multiple Pre- and/or Post-Pogosticking Counts for such search result may be averaged together with the metrics from other search sessions. The Pogosticking procedure 400 may be repeated for any number and type of search sessions to continually track pogosticking metrics across any desired time frame.

The Pogosticking metrics may be stored, for example, in a database as shown in FIG. 2B and then presented to one or more users in suitable format, such as a table or a list of metrics. These users may be search algorithm programmers who then use the metrics to adjust the relevancy of search results produced by a search algorithm. For instance, the pogosticking metrics may be used as a factor in determining search result relevance and subsequent ranking. Several embodiments of techniques for performing ranking are further described in co-pending U.S. application Ser. No. 11/474,195 filed 22 Jun. 2006 by Pavel Berkhin et al., which application is incorporated herein by reference in its entirety for all purposes. These ranking techniques may be adjusted so as to produce a new ranking of search results for a particular search term. For example, one or more scaling factors that are related to one or more pogosticking metrics may be used for each search result so as to cause the search result's ranking to be adjusted based on such pogosticking metrics. Search term purchasers may also use the metrics to assess the effectiveness of particular search result rankings. For example, a search result with a high (Pre-Pogosticking)/(Post-Pogosticking) ratio may be deemed to be less relevant than a search result with a lower ratio. In the algorithm application, an algorithm may be adjusted so as to minimize such ratio for particular search results, for example, by lowering the ranking of such search results as an attempt at reducing Post-Pogosticking for such search results.

Example embodiments of the present invention have several associated advantages. For example, embodiments of the present invention provide a new measure of a search result's relevancy and reach in the search industry. For instance, a search result owner can determine a specific, quantified value for pogosticking to and from its own search result. An owner can also assess the value of different bid packages, e.g., different sponsor positions or different sets of search results in different sponsor positions, etc., based on such pogosticking metrics. The owner can also assess the affect that other related search results have on their particular search result of interest by obtaining and comparing pogosticking metrics, for example, for a wide range of search results. Additionally, embodiments of the present invention provide an automated and easily scaleable mechanism for obtaining pogosticking metrics. Without such an automated process, a researcher would have to manually, on an ad hoc basis, determine pogosticking metrics by analyzing the search results, and this manual process would not be easily scalable.

Figure 5:
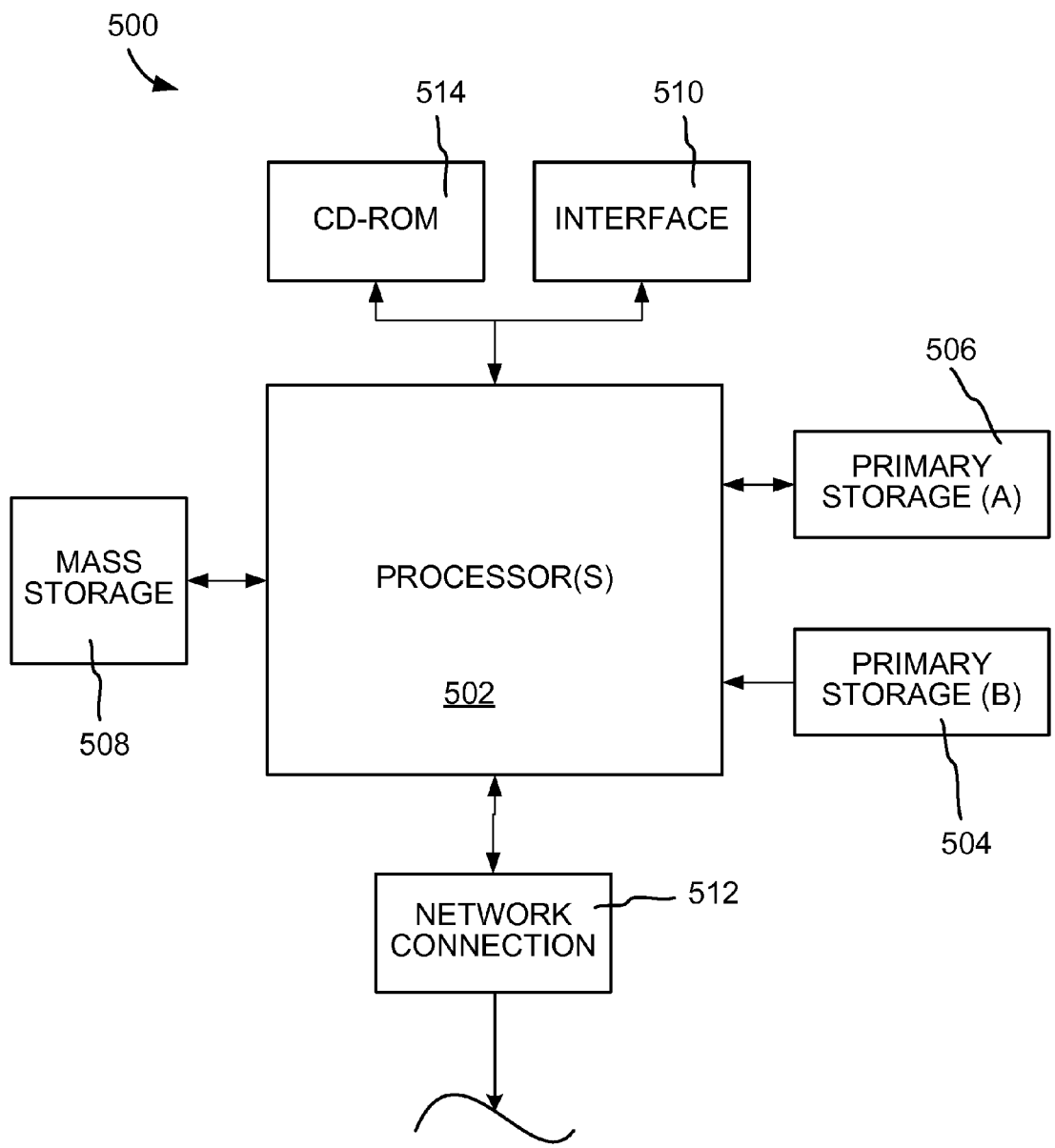
FIG. 5 illustrates an example computer system in which specific embodiments of the present invention may be implemented.

The present invention may be implemented in any suitable combination of hardware and/or software. FIG. 5 illustrates a typical computer system that, when appropriately configured or designed, can serve as pogosticking evaluator of this invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general-purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described above. A mass storage device 508 is also coupled bi-directionally to CPU 502 and provides additional data storage capacity and may include any of the computer-readable media described above. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store search database(s), pogosticking metrics database(s), etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine codes, such as produced by a compiler, and files containing higher-level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
for a particular search term and a particular search result, for each one of a plurality of users, tracking both (i) a first number of times the one of the each of a plurality of users selects other search results, which are presented within a same search request session for the particular search term, before selecting the particular search result for the same search request session and (ii) a second number of times the one of the plurality of users selects other search results, which are presented within the same search request session for the particular search term, after selecting the particular search result for the same search request session; and
for the particular search term and the particular search result, quantifying and storing by a processor a metric for a number of times each of the plurality of users selects other search results, which are presented within a same search request session for the particular search term, before or after selecting the particular search result for the same search request session, wherein quantifying comprises both (i) quantifying a first average of the first number of times each of the plurality of users selects other search results, which are presented within a same search request session for the particular search term, before selecting the particular search result for the same search request session and (ii) quantifying a second average of the second number of times each of the plurality of users selects other search results, which are presented within a same search request session for the particular search term, after selecting the particular search result for the same search request session.

2. The method as recited in claim 1, further comprising associating with the first and second averages, an identifier of the particular search result and one or more of the following associated information: an indication of a type of the particular search result, an average ranking of the particular search result, or the search term used in the particular search request.

3. The method as recited in claim 2, further comprising presenting the first and second averages for the particular search result, along with the associated information, to a user that has requested such first and second averages and associated information.

4. The method as recited in claim 1, further comprising adjusting a search algorithm based on the stored metric that is based on the number of times each of the plurality of users selects other search results before or after selecting the particular search result for a same search request.

5. An apparatus comprising at least a processor and a memory, wherein the processor and/or memory are configured to perform the following operations:
for a particular search term and a particular search result, for each one of a plurality of users, tracking how many both (i) a first number of times the one of the plurality of users selects other search results, which are presented within a same search request session for the particular search term, before selecting the particular search result for the same search request session and (ii) a second number of times the one of the plurality of users selects other search results, after selecting the particular search result for the same search request session; and
for the particular search term and the particular search result, quantifying and storing a metric for a number of times each of the plurality of users selects other search results, which are presented within a same search request session for the particular search term, before or after selecting the particular search result for the same search request session, wherein quantifying comprises both (i) quantifying a first average of the first number of times each of the plurality of users selects other search results, which are presented within a same search request session for the particular search term, before selecting the particular search result for the same search request session and (ii) quantifying a second average of the second number of times each of the plurality of users selects other search results, which are presented within a same search request session for the particular search term, after selecting the particular search result for the same search request session.

6. The apparatus as recited in claim 5, wherein the processor and/or memory are further configured to perform the operation of associating with the first and second averages, an identifier of the particular search result and one or more of the following associated information: an indication of a type of the particular search result, an average ranking of the particular search result, or the search term used in the particular search request.

7. The apparatus as recited in claim 6, wherein the processor and/or memory are further configured to perform the following operation of presenting the first and second averages for the particular search result, along with the associated information, to a user that has requested such first and second averages and associated information.

8. The apparatus as recited in claim 5, wherein the processor and/or memory are further configured to perform the operation of adjusting a search algorithm based on the stored metric that is based on the number of times each of the plurality of users selects other search results before or after selecting the particular search result for a same search request.

9. At least one computer readable storage medium having computer program instructions stored thereon, the computer readable storage medium comprising magnetic media, optical media, or magneto-optical media, and the computer program instructions being arranged to perform the following operations:
for a particular search term and a particular search result, for each one of a plurality of users, tracking both (i) a first number of times the one of the plurality of users selects other search results, which are presented within a same search request session for the particular search term, before selecting the particular search result for the same search request session and (ii) a second number of times the one of the plurality of users selects other search results, which are presented within the same search request session for the particular search term, after selecting the particular search result for the same search request session; and
for the particular search term and the particular search result, quantifying and storing a metric for a number of times each of the plurality of users selects other search results, which are presented within a same search request session for the particular search term, before or after selecting the particular search result for the same search request session, wherein quantifying comprises both (i) quantifying a first average of the first number of times each of the plurality of users selects other search results, which are presented within a same search request session for the particular search term, before selecting the particular search result for the same search request session and (ii) quantifying a second average of the second number of times each of the plurality of users selects other search results, which are presented within a same search request session for the particular search term, after selecting the particular search result for the same search request session.

10. The at least one computer readable storage medium as recited in claim 9, wherein the computer program instructions stored thereon are further arranged to perform the operation of associating with the first and second averages, an identifier of the particular search result and one or more of the following associated information: an indication of a type of the particular search result, an average ranking of the particular search result, or the search term used in the particular search request.

11. The at least one computer readable storage medium as recited in claim 10, wherein the computer program instructions stored thereon are further arranged to perform the operation of presenting the first and second averages for the particular search result, along with the associated information, to a user that has requested such first and second averages and associated information.

12. The at least one computer readable storage medium as recited in claim 9, wherein the computer program instructions stored thereon are further arranged to perform the operation of adjusting a search algorithm based on the stored metric that is based on the number of times each of the plurality of users selects other search results before or after selecting the particular search result for a same search request.

13. The method as recited in claim 1, wherein tracking a number of times the one of the plurality of users selects other search results, which are presented within a same search request session for the particular search term, before or after selecting the particular search result for the same search request session comprises:
when the one of the plurality of users selects another search result, presented within the same search request session for the particular search term, before selecting the particular search result for the same search request session, incrementing the first number of times the one of the plurality of users selects other search results, which are presented within the same search request session for the particular search term, before selecting the particular search result for the same search request session.

14. The method as recited in claim 1, wherein tracking a number of times the one of the plurality of users selects other search results, which are presented within a same search request session for the particular search term, before or after selecting the particular search result for the same search request session comprises:

when the one of the plurality of users selects another search result, presented within the same search request session for the particular search term, after selecting the particular search result for the same search request session, incrementing the second number of times the one of the plurality of users selects other search results, which are presented within the same search request session for the particular search term, after selecting the particular search result for the same search request session.

15. The apparatus as recited in claim 5, wherein tracking a number of times the one of the plurality of users selects other search results, which are presented within a same search request session for the particular search term, before or after selecting the particular search result for the same search request session comprises:

when the one of the plurality of users selects another search result, presented within the same search request session for the particular search term, before selecting the particular search result for the same search request session, incrementing the first number of times the one of the plurality of users selects other search results, which are presented within the same search request session for the particular search term, before selecting the particular search search request session.

16. The apparatus as recited in claim 5, wherein tracking a number of times the one of the plurality of users selects other search results, which are presented within a same search request session for the particular search term, before or after selecting the particular search result for the same search request session comprises:

when the one of the plurality of users selects another search result, presented within the same search request session for the particular search term, after selecting the particular search result for the same search request session, incrementing the second number of times the one of the plurality of users selects other search results, which are presented within the same search request session for the particular search term, after selecting the particular search result for the same search request session.

17. The at least one computer readable storage medium as recited in claim 9, wherein tracking a number of times the one of the plurality of users selects other search results, which are presented within a same search request session for the particular search term, before or after selecting the particular search result for the same search request session comprises:

when the one of the plurality of users selects another search result, presented within the same search request session for the particular search term, before selecting the particular search result for the same search request session, incrementing the first number of times the one of the plurality of users selects other search results, which are presented within the same search request session for the particular search term, before selecting the particular search result for the same search request session.

18. The at least one computer readable storage medium as recited in claim 9, wherein tracking a number of times the one of the plurality of users selects other search results, which are presented within a same search request session for the particular search term, before or after selecting the particular search result for the same search request session comprises:

when the one of the plurality of users selects another search result, presented within the same search request session for the particular search term, after selecting the particular search result for the same search request session, incrementing the second number of times the one of the plurality of users selects other search results, which are presented within the same search request session for the particular search term, after selecting the particular search result for the same search request session.

\* \* \* \* \*

UNITED STATES PATENT AND TRADEMARK OFFICE
CERTIFICATE OF CORRECTION

| | | |
|---|---|---|
| PATENT NO. | : 7,899,815 B2 | Page 1 of 1 |
| APPLICATION NO. | : 11/743623 | |
| DATED | : March 1, 2011 | |
| INVENTOR(S) | : Kehl et al. | |

It is certified that error appears in the above-identified patent and that said Letters Patent is hereby corrected as shown below:

In line 4 of claim 1 (column 10, line 27) delete "each of a".

In line 5 of claim 5 (column 11, line 10) delete "how many".

In line 15 of claim 15 (column 13, line 27) change "search search request session" to --search request session--.

Signed and Sealed this
Seventeenth Day of May, 2011

David J. Kappos
*Director of the United States Patent and Trademark Office*